J. R. MOFFATT.
TRIMMING DEVICE FOR SEWING MACHINES.
APPLICATION FILED AUG. 29, 1904.

1,097,040.

Patented May 19, 1914.
5 SHEETS—SHEET 1.

Witnesses
F. L. Onraud
Grace P. Brereton

Inventor
James R. Moffatt
By C. L. Sturtevant
Attorney

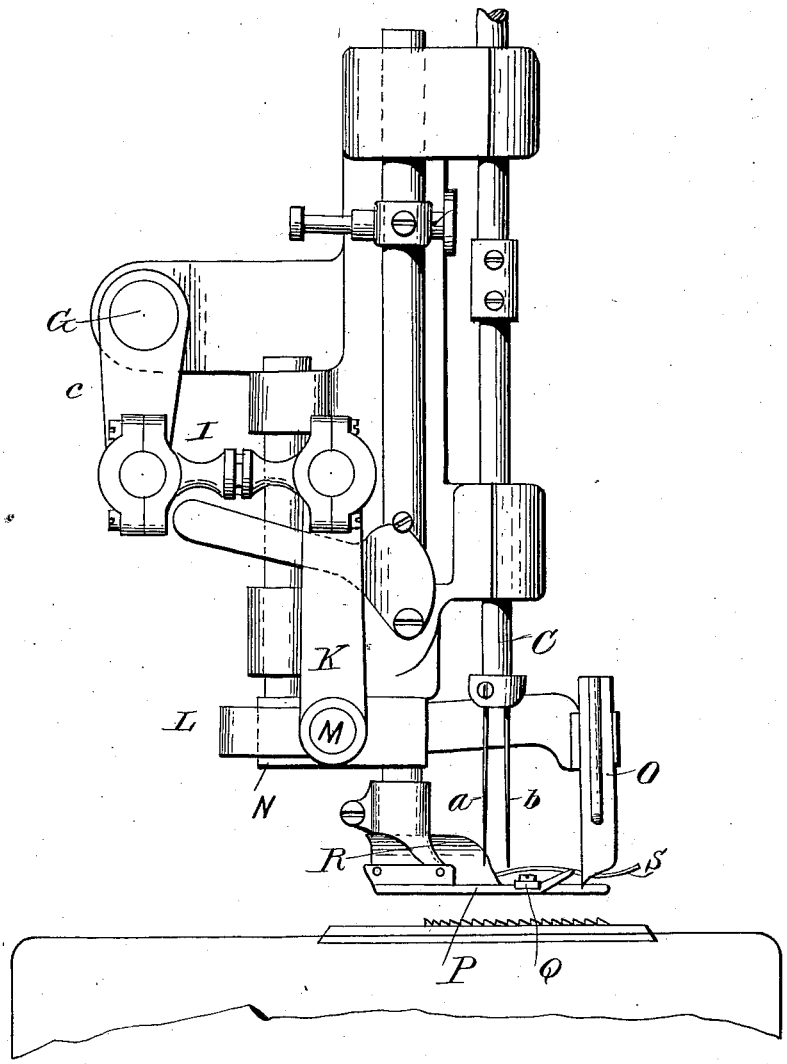

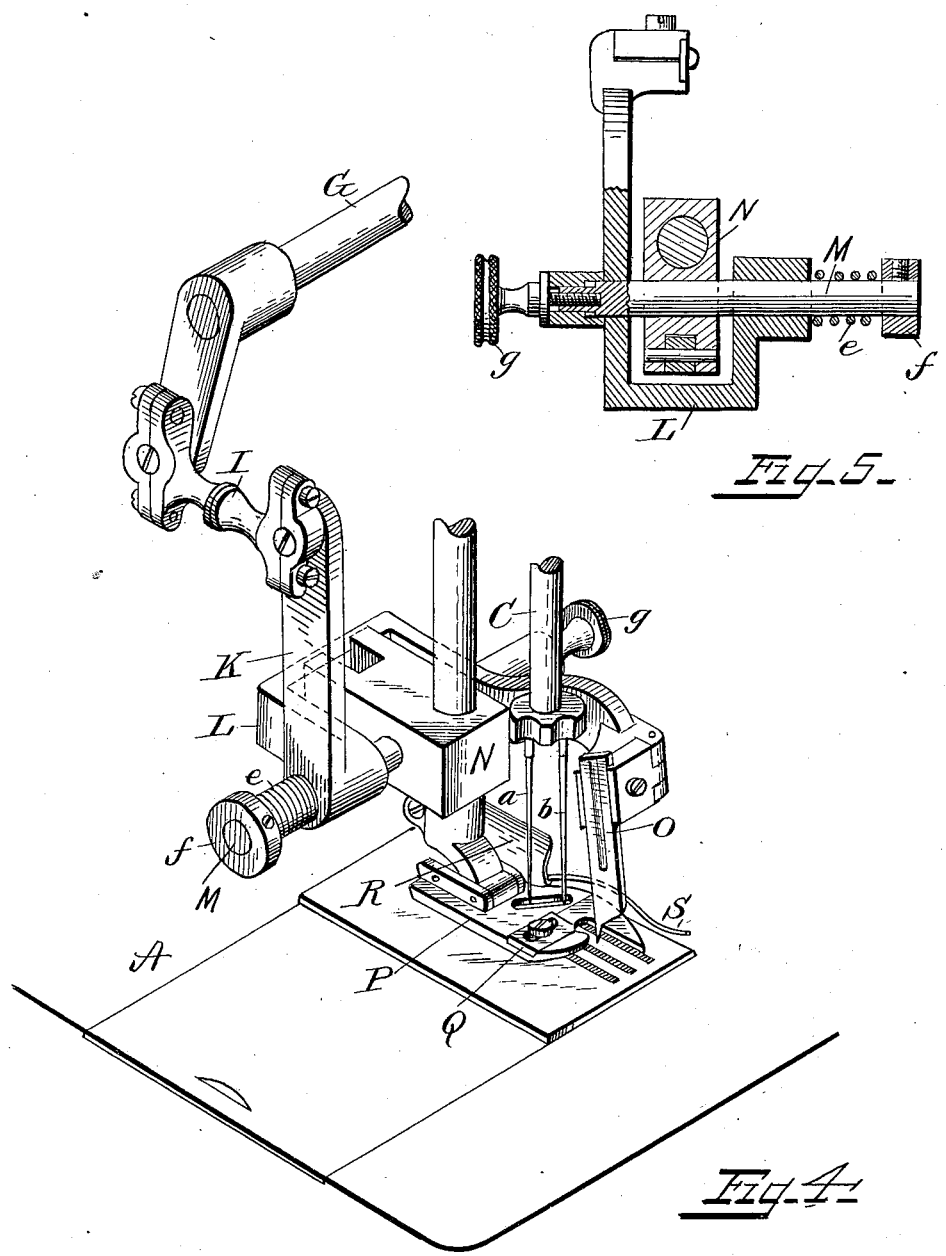

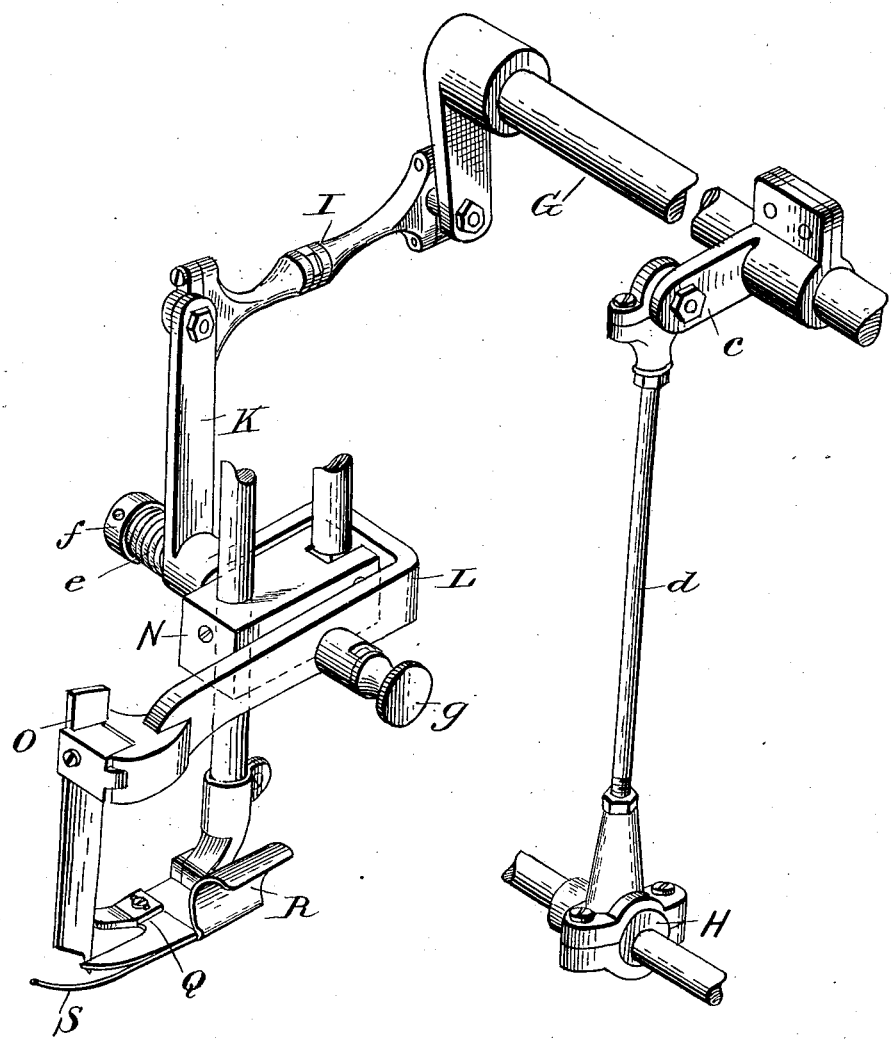

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING DEVICE FOR SEWING-MACHINES.

1,097,040.  Specification of Letters Patent.  Patented May 19, 1914.

Application filed August 29, 1904. Serial No. 222,609.

*To all whom it may concern:*

Be it known that I, JAMES R. MOFFATT, a citizen of the United States, residing at Chicago, in the county of Cook, State of Illinois, have invented certain new and useful Improvements in Trimming Devices for Sewing-Machines, of which the following is a description, reference being had to the accompanying drawing and to the letters and figures of reference marked thereon.

The present invention relates to improvements in trimming devices for sewing machines and while for convenience I have illustrated the trimmer as applied to a machine having a cross stitch mechanism, whereby certain work such as necking of underwear may be carried out on the machine, which machine with the trimmer forms the subject-matter of an application executed by me of even date herewith, filed July 8th, 1904, Serial No. 215,796 it will be understood that the present invention relates more especially to the trimming mechanism *per se*, and I do not wish to be limited to its application to any particular style of stitch forming mechanism.

The object of the invention is to provide a trimming apparatus which is entirely supported above the bed plate of the machine, which can be adjusted laterally to vary the distance of the cutting from the line of the seam, which can be raised or lowered bodily with the presser foot and which partakes of the movement of the presser foot under the action of increased thicknesses of goods and which can be employed to sever the top layer or layers of several superposed pieces of fabric without severing the lower layer or layers.

The invention consists in the matters hereinafter described and referred to in the appended claims.

The invention is illustrated in the accompanying drawings in which—

Figure 1:
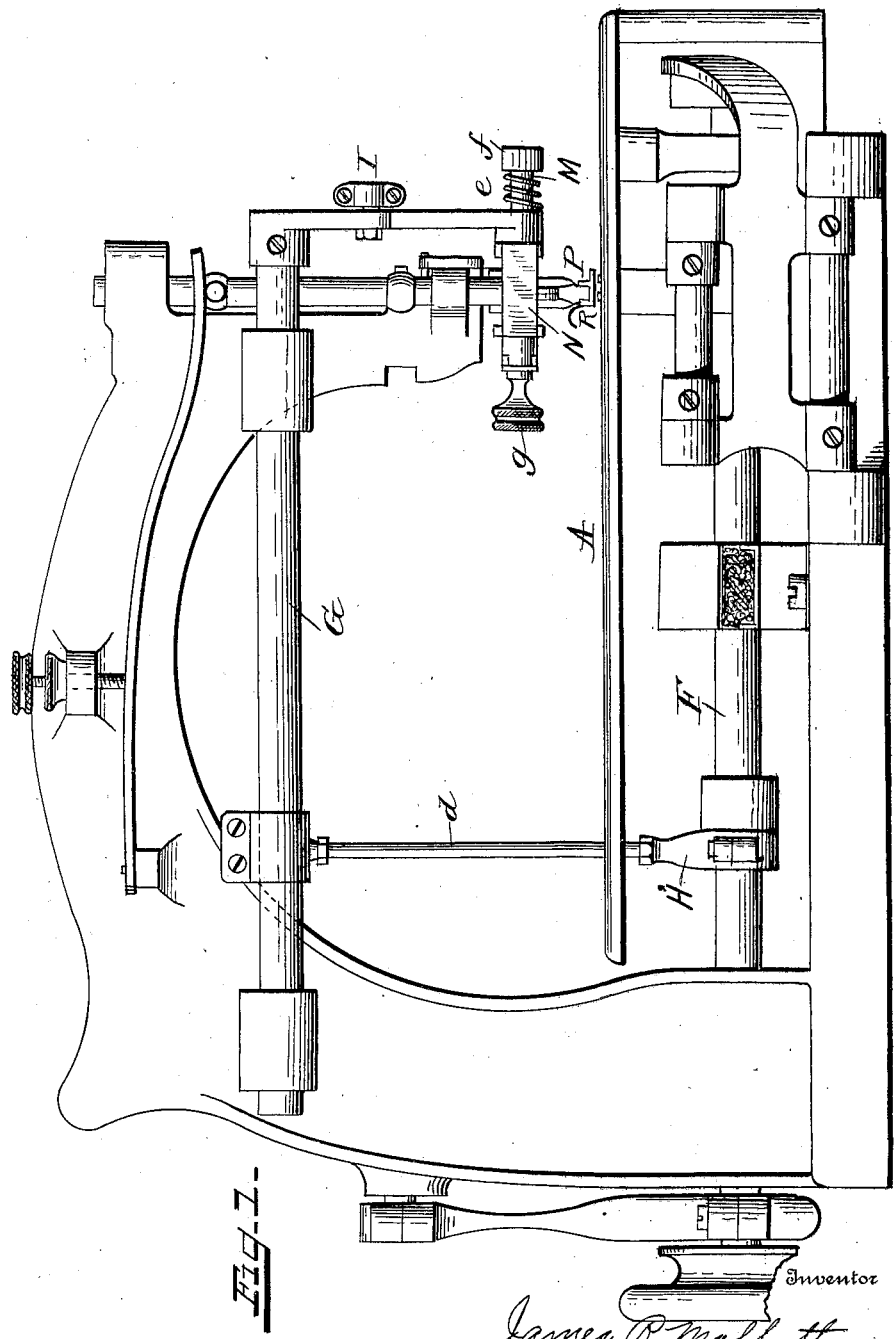
Figure 2:
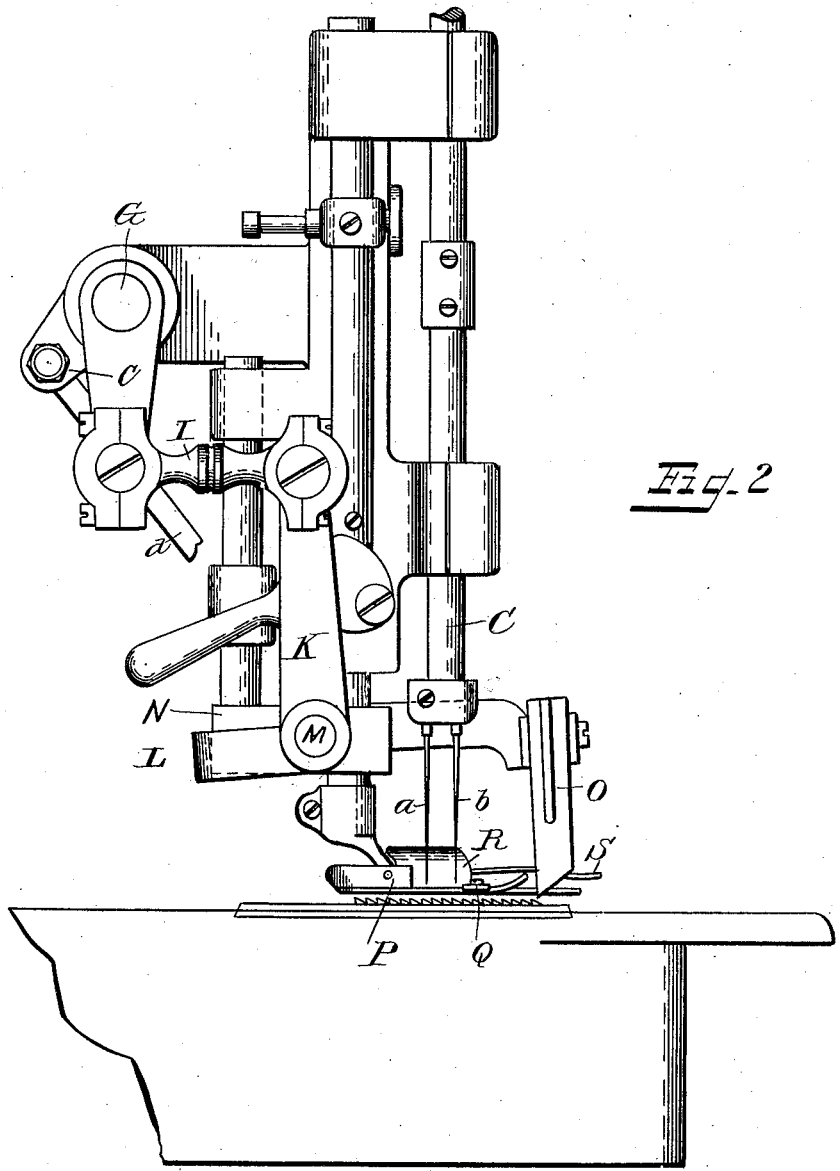

Figure 1 is a rear elevation of the sewing machine showing my trimming device applied thereto; Fig. 2 is an end elevation showing the presser foot in lower position; Fig. 3 is an end elevation showing the presser foot raised; Fig. 4 is a detail perspective showing the trimmer raised and means for operating it and Fig. 5 is a horizontal section of the trimmer frame. Fig. 6 is a perspective view of the trimmer-operating parts, trimmer and presser foot.

Referring to the drawings A represents the bed plate of a sewing machine of a well known Union Special type. C the needle bar, *a b* the needles which are herewith shown as arranged oblique to each other respecting the line of feed and F is the driving shaft.

G represents a rock shaft upon which the rocking sleeve is supported, this rock shaft G being journaled in bearings on the machine frame, and operated by the crank and eccentric rod *c, d*, from the eccentric H on the main shaft. At the forward end said rock shaft G is provided with a depending arm or crank which has a usual clamp and ball and stud connection with one end of a link I which has the usual clamp and ball and stud connection with the arm K projecting upwardly from the trimmer frame L, which is journaled on the shaft M fixed in the block N carried by the presser bar. Through oscillation of the rock shaft G the trimmer frame is oscillated and this trimmer frame carries on its forward end a clamp by which the upper trimmer blade O is clamped to the trimmer frame arm. This clamp is of a well known type such as is common to Union Special overseaming machines having a trimmer. The trimmer frame is under spring tension by the spring *e*, which is adjusted by collar *f*, and the thumb screw *g*, thus adjusting the upper trimming knife against the lower one, it being held against it laterally by this spring tension. The presser foot P of the machine is provided with a laterally adjustable member Q which forms the lower or rigid member of the trimming device coöperating with the upper movable trimmer blade and in rear said presser foot is provided with a guide R for deflecting a portion of the fabric trimmed off while a finger or wire S serves to hold the upper layer of goods down on the presser foot and prevent displacement thereof. The forward end of the rigid member Q of the trimmer is pointed to enter between the superposed layers of fabric, the layers above the same being cut by the upper movable member coöperating with the lower stationary member, while the other uncut layers are fed beneath the presser foot and the part of the portion severed is deflected by the guide, while the other portion severed is sewed down to the uncut fabric and fed beneath the other or upturned toe T of the presser foot. The upper trimming blade O is provided with a sharp point which would enable the cutter to pierce a layer of material if placed beneath the same. It will be seen that the lower stationary member of the cutting blade may be adjusted laterally to correspond with the lateral adjustment of the trimmer frame and upper movable member and that as the trimmer frame is supported on the presser bar and the lower member of the cutting device upon the presser foot, that the entire trimmer, both upper and lower members, is raised and lowered bodily with the presser foot and also when the presser foot rises and falls under the action of an increased or lessened thickness of goods the trimmer will rise and fall bodily. As the cutting action is caused by the shearing of the movable blade against the stationary member, it will be seen that when several thicknesses of goods are run into the machine the trimmer and presser foot will be raised and, therefore, the whole trimming action will be above the presser foot and only that portion of the goods which has passed over the stationary pointed member will be cut.

Various minor modifications and changes may be made without departing from the spirit of my invention.

Having thus described my invention, what I claim as new and desire to secure by Letters Patent of the United States is:—

1. In a sewing machine, suitable stitch-forming mechanism, means for feeding a plurality of thicknesses of material, a presser foot, a presser bar supporting the same, an oscillating frame vertically movable with the presser bar, and means connected to said frame for oscillating the same, a trimmer blade carried by said oscillating frame, a trimmer member rigidly supported by and vertically movable with the presser foot, and adapted to separate the layers of fabric and coöperate with the movable trimmer blade to sever the layers above the former, both the trimmer blade and the coöperating member being laterally adjustable; substantially as described.

2. In a sewing machine, suitable stitch-forming mechanism, means for feeding a plurality of thicknesses of material, a presser foot, a presser bar supporting the same, an oscillating frame vertically movable with the presser bar, and means for oscillating the same, a trimmer blade carried by said oscillating frame, a trimmer member rigidly supported by and vertically movable with the presser foot and adapted to separate the layers of fabric, and a separate member pressing upon the upper layer of fabric and holding the same from displacement; substantially as described.

3. In a sewing machine, suitable stitch-forming mechanism, means for feeding a plurality of thicknesses of material, a presser foot, a presser bar supporting the same, an oscillating frame vertically movable with the presser bar, and means connected to said frame for oscillating the same, a trimmer blade carried by said oscillating frame, a trimmer member rigidly supported by and vertically movable with the presser foot and adapted to separate the layers of fabric and to coöperate with the movable trimmer member to sever the layer of fabric above the former, and a guide for deflecting the trimmed off strip; substantially as described.

4. In a sewing machine stitch forming mechanism, a presser foot, a presser bar carrying the same, a trimming mechanism operating to sever the fabric in advance of the stitch forming mechanism and including a block carried by said presser bar, a frame pivotally supported on said block, and means connected to said frame for oscillating the same, a blade carried by said oscillating frame, and a coöperating cutter member rigidly supported by the presser foot; substantially as described.

5. In a sewing machine stitch forming mechanism, a presser foot, a presser bar carrying the same, a trimming mechanism operating in advance of the stitch forming mechanism and including a block carried by said presser bar, a frame pivotally supported on said block, and means connected to said frame for oscillating the same, a blade carried by said oscillating frame, and a coöperating cutter member rigidly supported by the presser foot, and having a pointed end to enter between the layers of fabric; substantially as described.

6. In a sewing machine, a presser foot, a presser bar carrying the same, a block carried by said presser bar, a frame pivotally supported on said block, and means connected to said frame for oscillating the same, a blade carried by said oscillating frame, and a coöperating cutter member rigidly carried by the presser foot, and means for adjusting the lateral position of the frame and the cutting member; substantially as described.

7. In a sewing machine stitch forming mechanism, a presser foot, a presser bar carrying the same, a trimming mechanism operating in advance of the stitch forming mechanism and a block carried by said presser bar, a frame pivotally supported on said block, and means for oscillating said frame, a blade carried by said oscillating frame, and a coöperating cutter member rigidly supported by the presser foot, and a spring for keeping the frame in such position that the upper blade will be normally in coöperative relation to the rigidly supported member; substantially as described.

8. In a sewing machine, suitable stitch-forming mechanism, a presser foot, means for feeding a plurality of thicknesses of material, trimming mechanism comprising a device carried by the presser foot for separating the thicknesses as the trimming is performed, the edge of said device serving as one of the members of the trimming mechanism, and means on the presser foot to hold the upper layer of goods from displacement; substantially as described.

9. In a sewing machine, suitable stitch-forming mechanism, a presser foot, means for feeding a plurality of thicknesses of material, trimming mechanism comprising a device carried by the presser foot for separating the thicknesses as the trimming is performed, the edge of said device serving as one of the members of the trimming means, means on the presser foot to hold the upper layer of goods from displacement, said presser foot being provided with a guard in rear of the stitch-forming mechanism to deflect the trimmed off strip; substantially as described.

10. In a sewing machine stitch forming mechanism, the combination with the presser bar, and the presser foot carried thereby, of a trimming mechanism operating in advance of the stitching mechanism and including a cutting blade rigidly carried by said presser foot, a block carried by said presser bar, a rock shaft pivoted in said block, a frame on said rock shaft, having an arm supporting the trimmer blade, and means connected to said frame for oscillating the same; substantially as described.

11. In a sewing machine stitch forming mechanism, the combination with the presser bar, and the presser foot carried thereby, of a trimming mechanism operating in advance of the stitching mechanism and including a cutting blade carried rigidly by said presser foot, a block carried by said presser bar, a rock shaft pivoted in said block, a frame on said rock shaft, having an arm supporting the trimmer blade, means for oscillating said frame, said frame being normally spring pressed laterally to cause the trimmer blade to engage the lower member; substantially as described.

12. In a sewing machine, the combination with the presser bar, and the presser foot carried thereby, of a cutting member carried by said presser foot, a block carried by said presser bar, a rock shaft pivoted in said block, a frame on said rock shaft, having an arm supporting a trimmer blade, means for oscillating said frame, said frame being normally spring pressed laterally to cause the trimmer blade to engage the lower member, and means for laterally adjusting the two members of the trimming mechanism; substantially as described.

13. In a sewing machine, the combination with the presser foot of a cutting member rigidly supported by said presser foot and adapted to enter and separate layers of fabric, and a coöperating movable member above the presser foot, with means for operating it, said movable member also partaking of the vertical movements of the presser foot, said presser foot having a guide for deflecting the trimmed off strip; substantially as described.

14. In a sewing machine, the combination with the presser foot carrying a cutting member adapted to enter and separate layers of fabric, of a coöperating movable member above the presser foot, with means for operating it, said movable member also partaking of the vertical movements of the presser foot, said presser foot having a member for preventing displacement of the upper layer of fabric, substantially as described.

15. The combination with stitch forming mechanism, and a presser foot, of a cutting member rigidly supported by said presser foot partaking of the vertical movements thereof, and shaped to separate layers of fabric of which the layers above it are to be severed in advance of the stitching, a movable cutting member above the presser foot, coöperating with the first named cutting member, and means independent of the stitch forming mechanism for positively operating it, said movable cutting member partaking also of the bodily movements of the presser foot; substantially as described.

16. In a sewing machine, the combination of a presser foot, stitch forming mechanism and a trimmer mechanism including a lower cutting member having a forwardly projecting end shaped to enter between and separate the layers of fabric, said lower cutting member being rigidly supported by said presser foot and movable therewith, an upper cutting member coöperating with said lower cutting member, and means independent of the stitch forming mechanism for positively reciprocating said upper cutting member.

17. In a sewing machine, the combination of a presser foot, stitch forming mechanism and trimming mechanism including a lower cutting member mounted on the presser foot, and having a cutting edge projecting in front of the presser foot and located above the lower surface thereof, said lower cutting member projecting in the line of feed and shaped to enter between and separate the layers of fabric, an upper cutting member adapted to coöperate with said lower cutting member and means independent of the stitch forming mechanism for positively reciprocating said upper cutter member.

18. In a sewing machine, suitable stitch forming mechanism, a presser foot, means for feeding a plurality of thicknesses of material, cutting mechanism comprising a device for separating the thicknesses as the cutting is performed, whereby only one of the thicknesses is cut and means mounted on said presser foot to hold the material from displacement.

In testimony whereof I affix my signature, in presence of two witnesses.

JAMES R. MOFFATT.

Witnesses:
CHESTER McNEIL,
C. E. CULLEY.

Copies of this patent may be obtained for five cents each, by addressing the "Commissioner of Patents, Washington, D. C."